United States Patent
Hu et al.

(10) Patent No.: US 9,335,456 B2
(45) Date of Patent: May 10, 2016

(54) LIGHT SOURCE MODULE

(71) Applicant: HON HAI PRECISION INDUSTRY CO., LTD., New Taipei (TW)

(72) Inventors: Chau-Jin Hu, New Taipei (TW); Feng-Yuen Dai, New Taipei (TW); Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 160 days.

(21) Appl. No.: 14/141,470

(22) Filed: Dec. 27, 2013

(65) Prior Publication Data

US 2015/0153499 A1    Jun. 4, 2015

(30) Foreign Application Priority Data

Dec. 2, 2013   (TW) .............................. 102144003 A

(51) Int. Cl.
    *G02B 6/04* (2006.01)
    *F21V 8/00* (2006.01)

(52) U.S. Cl.
    CPC .................................... *G02B 6/0008* (2013.01)

(58) Field of Classification Search
    CPC ............. G02B 6/00; G02B 27/00; G02B 1/00
    See application file for complete search history.

(56) References Cited

U.S. PATENT DOCUMENTS

| | | | |
|---|---|---|---|
| 6,582,115 B2 * | 6/2003 | Huang | 362/565 |
| 6,817,745 B2 * | 11/2004 | Leung et al. | 362/555 |
| 6,880,961 B2 * | 4/2005 | Lin | 362/554 |
| D523,974 S * | 6/2006 | Meyers | D26/26 |
| D577,837 S * | 9/2008 | Cole | D26/25 |
| 7,959,338 B2 * | 6/2011 | Kazakevich | 362/574 |
| D651,329 S * | 12/2011 | Bonang | D26/27 |
| 2004/0264852 A1 * | 12/2004 | Tang | 385/31 |
| 2014/0169023 A1 * | 6/2014 | Chen | 362/554 |

* cited by examiner

*Primary Examiner* — Ali Alavi
(74) *Attorney, Agent, or Firm* — Novak Druce Connolly Bove + Quigg LLP

(57) ABSTRACT

The present disclosure relates to a light source module which includes a light source and a plurality of fibers. The light source has a light emitting surface. The fibers are arranged on the light emitting surface of the light source. Each fiber includes a light input part contacting the light emitting surface and a light output part opposite to the light input part. The light output part of each fiber extends upwardly and outwardly from the light input part for guiding light from forward to outside.

8 Claims, 5 Drawing Sheets

LIGHT SOURCE MODULE

BACKGROUND

1. Technical Field

The disclosure relates to light source modules, and particularly to a light source module with even distribution of light emission.

2. Description of Related Art

Light emitting diodes' (LEDs) many advantages, such as high luminosity, low operational voltage, low power consumption, compatibility with integrated circuits, easy driving, long term reliability, and environmental friendliness have promoted their wide use as a lighting source.

However, the conventional LED illumination apparatus generally has a radiation angle about 120 degrees and generates a butterfly-type light field. The intensity of light emitted by the LED illumination apparatus dramatically decreases when the radiation angle exceeds 120 degrees. A central part of the light field has much stronger intensity than the other part. This light-emitting angle of the light source module is too small, and the light intensity is too concentrated at the central part of the light field, which make the light source module not suitable for use in some situations, for example, backlight module.

Therefore, what is needed is a light source module which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present light source module for microminiaturization. Moreover, in the drawing, like reference numerals designate corresponding parts throughout the whole view.

DETAILED DESCRIPTION OF EMBODIMENTS

Figure 1:
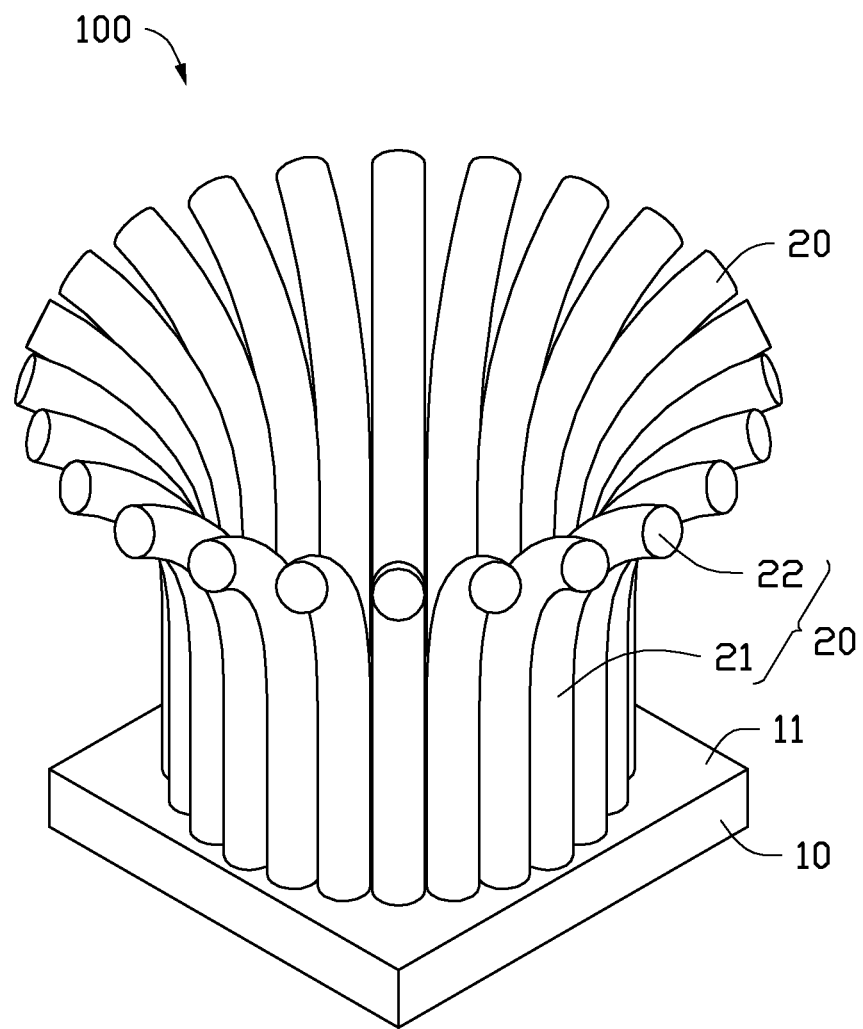
FIG. 1 is a schematic, isometric view of a light source module according to a first embodiment of the present disclosure.
Figure 2:
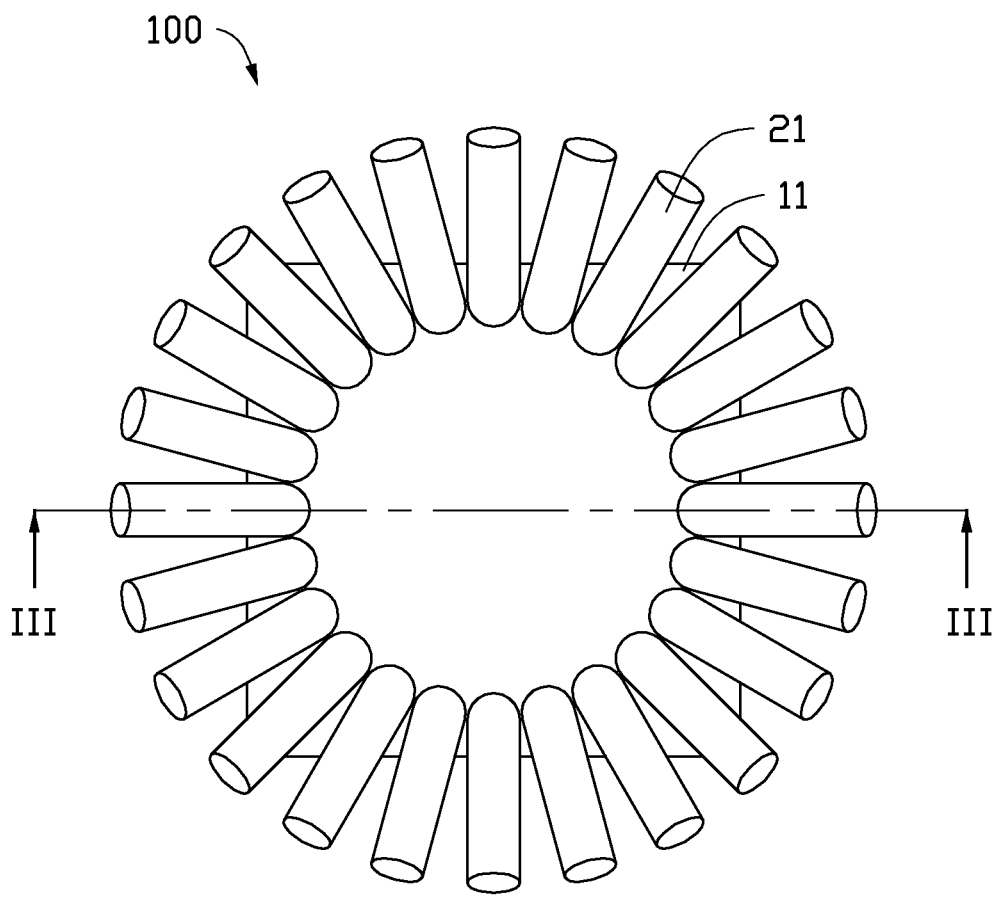
FIG. 2 is a top view of the light source module of FIG. 1.
Figure 3:
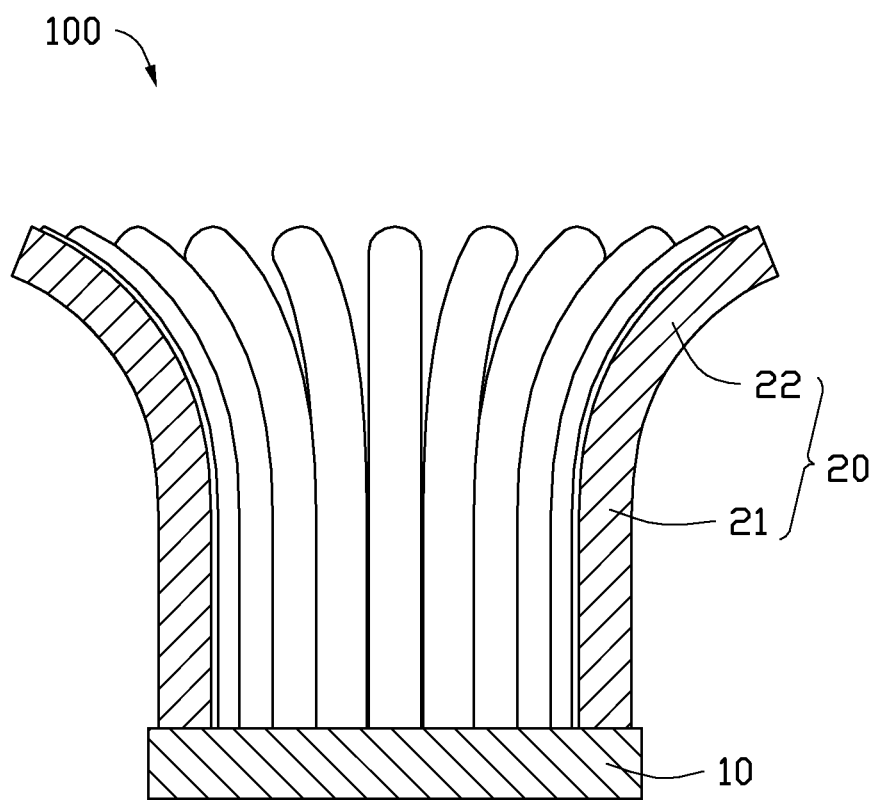
FIG. 3 is a cross-sectional view of the light source module of FIG. 1, taken along line III-III thereof.

Referring to FIGS. 1 to 3, a light source module 100 in accordance with a first embodiment of the present disclosure is illustrated. The light source module 100 includes a light source 10 and a plurality of fibers 20. Light emitted from the light source 10 is adjusted by the fibers 20.

The light source 10 includes a light emitting surface 11. In the present embodiment, the light source 10 is light emitting diode (LED).

The fibers 20 are arranged on the light emitting surface 11 of the light source 11. In the present embodiment, the fibers 20 are annularly arranged on a lateral side of the light emitting surface 11 of the light source 10. In other words, the fibers 20 arranged on an annulus for surrounding the light source 10. A length and a shape of the fibers 20 are similar to each other. Each fiber 20 includes a light input part 21 contacting the light emitting surface 11 and a light output part 22 opposite to the light input part 21. The light input part 21 is perpendicular to the light emitting surface 11 of the light source 10. The light output part 22 of each fiber 20 extends upwardly and outwardly from the light input part 21, for guiding light from forward to outside.

Light emitted from the center of the light source 10 is guided by the fibers 20 to different directions deviating from the center of the light source 10. In other words, the intensive central light is directed sideways; thus, the distribution of the intensity of the light field of the light source module 100 is more uniform.

Figure 4:
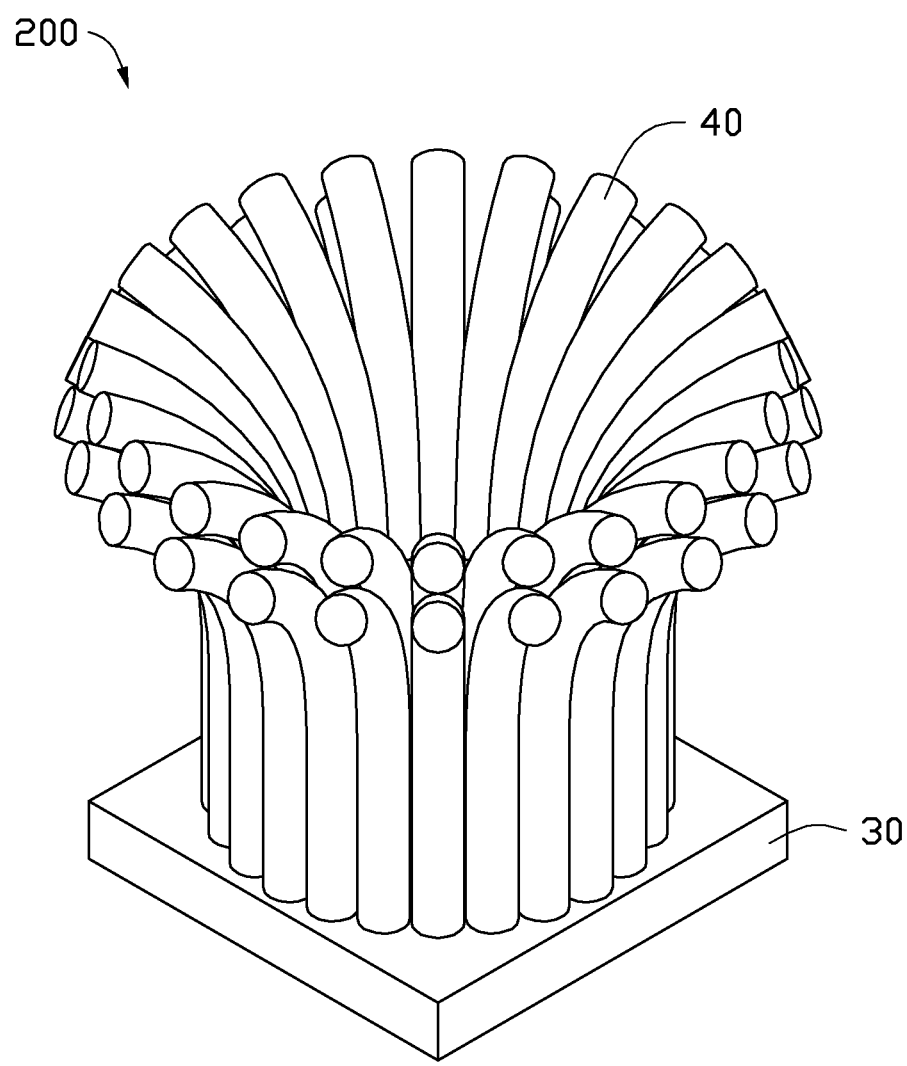
FIG. 4 is a schematic, isometric view of a light source module according to a second embodiment of the present disclosure.
Figure 5:
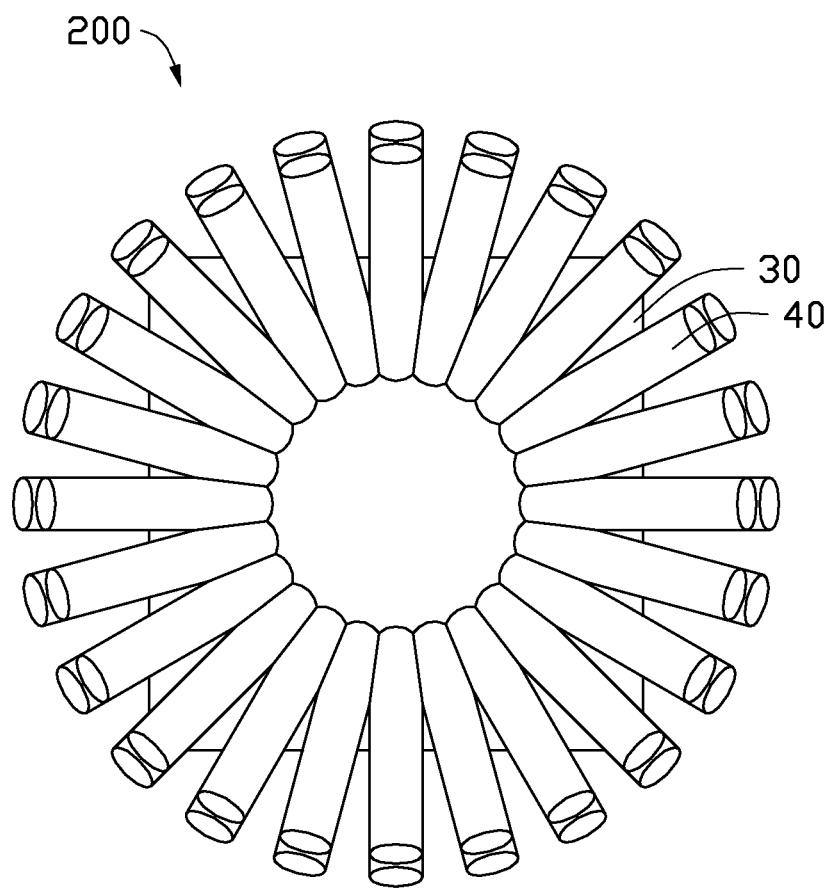
FIG. 5 is a top view of the light source module of FIG. 4.

Referring to FIGS. 4 and 5, a light source module 200 in accordance with a second embodiment of the present disclosure is illustrated. The light source module 200 includes a light source 30 and a plurality of fibers 40. Differing from the light source module 100, the fibers 40 are evenly divided into two groups and arranged on two concentric circles. The fibers 40 of the two groups are one-to-one correspondence. Light emitted from the center of the light source 30 is guided by the fibers 40 to different directions deviating from the center of the light source 30. Therefore, the distribution of the intensity of the light field of the light source module 200 is more uniform.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A light source module comprising:
a light source having a light emitting surface; and
a plurality of fibers arranged on the light emitting surface of the light source, each fiber comprising a light input part contacting the light emitting surface and a light output part opposite to the light input part, the light output part of each fiber extending upwardly and outwardly from the light input part for guiding light from forward to outside, a distance between the light input parts of each two adjacent fibers is smaller than a distance between the output parts of the two adjacent fibers, and the distance between two adjacent output parts being gradually increased from the input part to a distal end of the output part.

2. The light source module of claim 1, wherein the fibers are annularly arranged on the light emitting surface for surrounding the light source.

3. The light source module of claim 1, wherein the fibers are evenly divided into two groups and arranged on two concentric circles.

4. The light source module of claim 3, wherein the fibers of the two groups are one-to-one correspondence.

5. The light source module of claim 1, wherein the fibers are annularly arranged on a lateral side of the light emitting surface of the light source.

6. The light source module of claim 1, wherein a length and a shape of the fibers are similar to each other.

7. The light source module of claim 1, wherein the light input part is perpendicular to the light emitting surface of the light source.

8. The light source module of claim 1, wherein each fiber extends from the input part to the output part along a curved direction.

\* \* \* \* \*